United States Patent [19]

Sovereen

[11] Patent Number: 5,285,578
[45] Date of Patent: Feb. 15, 1994

[54] GAUGES FOR DETERMINING WHETHER STANDARDS FOR STEEL REINFORCING BARS ARE MET

[76] Inventor: Brent Sovereen, 2525 Kenwood St., Salt Lake City, Utah 84106

[21] Appl. No.: 817,605

[22] Filed: Jan. 7, 1992

[51] Int. Cl.$^5$ .............................................. G01B 5/20
[52] U.S. Cl. .................... 33/1 N; 33/501.08; 33/534; 33/545; 33/567; 33/562
[58] Field of Search ............ 33/501.45, 501.08, 501.5, 33/529, 534, 545, 546, 555.1, 561.1, 562, 567, 1 N

[56] References Cited

U.S. PATENT DOCUMENTS

| | | | |
|---|---|---|---|
| 1,755,152 | 4/1930 | Parker | 33/501.08 |
| 2,298,898 | 10/1942 | Oswin | 33/501.45 |
| 2,403,420 | 7/1948 | Willingham | 33/529 |
| 2,476,338 | 7/1949 | Vitez | 33/1 N |
| 2,719,359 | 10/1955 | Webber | 33/1 N |
| 2,938,270 | 5/1960 | Werner | 33/1 N |
| 3,365,804 | 1/1968 | Fjellström | 33/529 |
| 3,545,089 | 12/1970 | Beckwell | 33/529 |
| 4,333,240 | 6/1982 | Searcy | 33/534 |

FOREIGN PATENT DOCUMENTS 333226 6/1903 France .......................... 33/555.1

*Primary Examiner*—William A. Cuchlinski, Jr.
*Assistant Examiner*—Alvin Wirthlin
*Attorney, Agent, or Firm*—Mallinckrodt & Mallinckrodt

[57] ABSTRACT

The invention relates to a gauge or set of gauges for determining whether the bend angle, bend diameter, and end extension dimensions of a bent steel reinforcing bar used in structural concrete construction are within established allowable limits. The gauge comprises at least the outer marginal portion of a section of a circular disc, the disc having an outer perimeter which defines a diameter approximating the minimum bend diameter for a particular bar size and bar bend, the perimeter taking into account the deformations on said bar and indicating the starting and ending points of the bend, i.e., the points of tangency. Also included are methods of using such a gauge to determine whether a bar bend has less than the minimum bend angle and diameter and whether the end extension of such bend is less than the minimum allowable length.

4 Claims, 4 Drawing Sheets

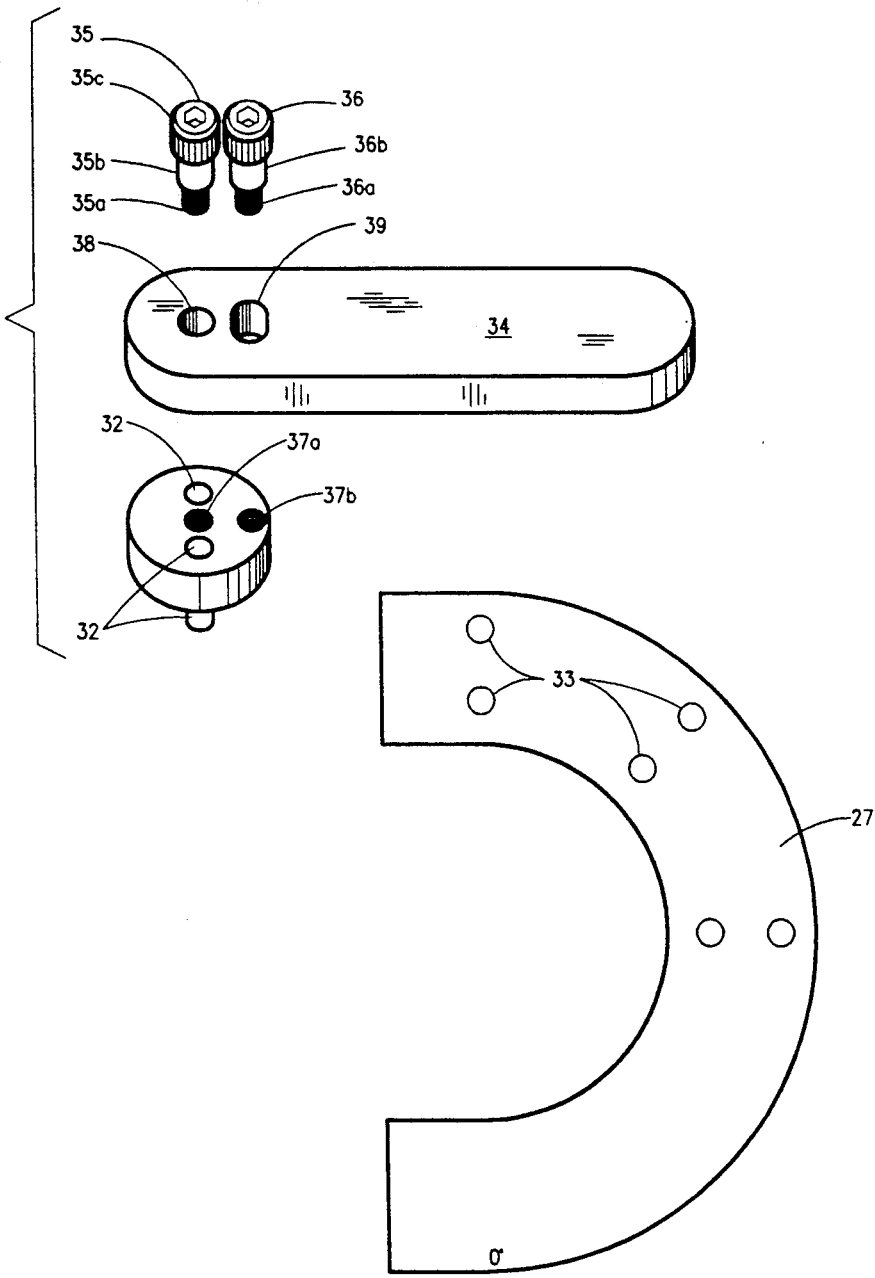

GAUGES FOR DETERMINING WHETHER STANDARDS FOR STEEL REINFORCING BARS ARE MET

BACKGROUND OF THE INVENTION

1. Field

The invention is in the field of measuring devices used to determine whether building code requirements have been met for steel reinforcing bars used in structural concrete.

2. State of the Art

The steel bars used in reinforced concrete construction, normally referred to as "reinforcement", "reinforcing bars", or simply "bars", are bent into shapes referred to as typical bar bends. One group of typical bar bends are known as "standard hooks". Included in the standard hooks are 90° and 180° end hooks, 90° and 135° stirrup and tie hooks, and 135° seismic stirrup and tie hooks.

The bends are at a required angle, plus or minus $2\frac{1}{2}$°, about an established diameter. Bends at the end of the bar have end extensions extending therefrom. Construction industry institutes and related societies such as the Concrete Reinforcing Steel Institute [CRSI], the American Concrete Institute [ACI], and the American Society of Testing Materials [ASTM] have promulgated minimum standards relating to reinforcing bars, the diameter of the bar bends, and the lengths of end extensions. The standards promulgated by such institutes have been adopted by the International Conference of Building Officials and are incorporated in the building codes of many local governmental bodies.

Any bar bend that is measured to have a bend diameter or end extension less than the established minimum is in violation of the code. Any bend angle that is outside the plus or minus $2\frac{1}{2}$° allowance from the established 90°, 135°, or 180° bends is in violation of the code. Such bars may be subject to premature fracture when put under load. Decisions on what to do when bends do not meet the code are the responsibility of the design professionals and any local building department. However, site inspectors are charged with the responsibility of inspecting steel reinforcement bars to see that, among other criteria, their bend angles, diameters, and end extensions are within the established standards. Site inspectors must somehow make this determination. However, so far as is known, the prior art has not provided any means or methods for determining whether bar bends and the end extensions of these bends are less than the established minimums.

SUMMARY OF THE INVENTION

It is the primary object of the invention to provide a gauge or set of gauges, and methods for their use, to determine whether the dimensions of a bar bend including the bend diameter, the end extension, if any, and the bend angle are within the established allowable limits. It is understood that where the phrase "established allowable limits" is used, it means the minimum bend diameter and/or the minimum end extension for a given bar size and the limits for bend angles as may be established from time to time by either an interested concrete or construction industry institute or a governmental body.

Each gauge includes at least a portion of a circular disc. The outer margin portion of the perimeter of the disc defines a diameter approximating the minimum bend diameter for a particular bar size and bend. One method for using the gauge comprises the steps of abutting the margin of the perimeter of the gauge defining the minimum bend diameter against the inside of a bar bend and then observing the interface between the gauge and the bend to determine whether the bend is less than the minimum as defined by the gauge.

Since established allowable minimum bend diameters are measured from the nominal diameter along the inside of a bar bend, a gauge for determining whether the bend diameter is less than the minimum bend diameter must have a perimeter approximating the minimum bend, while at the same time taking into account the deformations normally present on the steel bar being measured.

There are at least two alternative ways of taking the deformations into account. As one alternative, the deformations can be taken into account by having the perimeter define a diameter equal to the minimum bend diameter for the bar size and bend, which the gauge is adapted to measure, minus twice the minimum average height of a deformation for that particular bar size. Such a gauge would abut against the deformations along the inside of a bar bend.

As another alternative, the perimeter of the gauge can be formed with recesses adapted to receive the deformations of the steel bar being measured. The perimeter of the gauge between such recesses define protuberances. When pressed against the bar bend, the protuberances of the gauge abut against the nominal diameter of the bar instead of against the deformations. The minimum bend diameter is, thus, defined by the outer margin of the protuberances of the gauge.

Preferably the 0° point of each gauge is marked or otherwise indicated for lining up with the beginning of the bend. The point at the end of the bend (either 45°, 90°, 135°, or 180°), plus or minus $2\frac{1}{2}$°, is also marked on the gauge or otherwise indicated such as by a protractor pivotally attached to the gauge or by an elongate arm removably attached to the gauge alongside the 45°, 90°, 135°, or 180° points of tangency. Having the beginning and end of the bend thus indicated facilitates two other methods of using the gauge.

One method includes the steps of abutting the gauge against the inside of a bar bend, lining up the indications on the gauge of the beginning and end of the bend with the corresponding points on the bend, measuring the length of the end extension from the end point of the bend, and comparing the measured length with the established allowable minimum.

The other method includes the steps of abutting the gauge against the inside of a bar bend, lining up the indication on the gauge of the beginning of the bend, and determining whether the end of the bend is of the intended bend angle (90°, 135°, or 180°) plus or minus $2\frac{1}{2}$°.

THE DRAWINGS

In the accompanying drawings:

FIG. 1 is a front elevational view of a section of steel reinforcement bar;

FIG. 2, a cross sectional view taken along line 2—2 of FIG. 1.

FIG. 3, a diagram representing the dimensions of a 180° end hook;

FIG. 4, a diagram representing the dimensions of a 90° end hook;

FIG. 5, a diagram representing the dimensions of a 90° stirrup and tie hook;

FIG. 6, a diagram representing the dimensions of a 135° stirrup and tie hook;

FIG. 7, a diagram representing the dimensions of a 135° seismic stirrup and tie hook;

FIG. 8, a top plan view of a gauge formed according to the invention showing an angle indication arm with the relative movement of the angle indication arm indicated by broken lines;

FIG. 9, an exploded perspective view of the device of FIG. 8 showing the angle indication arm in position for insertion into the gauge;

FIG. 10, a perspective view from the bottom of an angle indication arm according to the invention;

FIG. 11, an exploded perspective view of the angle indication arm of FIG. 10;

FIG. 12, a top plan view of an alternative embodiment;

FIG. 13, a top plan view of yet another alternative embodiment; and

FIG. 14, a top plan view of a set of gauges formed according to the invention and drawn to a reduced scale.

DETAILED DESCRIPTION OF THE ILLUSTRATED EMBODIMENT

Figure 1:
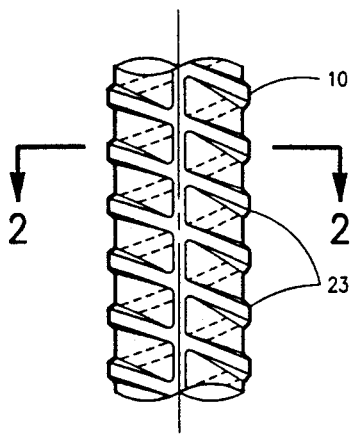
Figure 2:
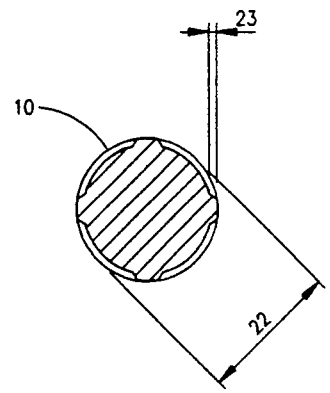

As shown diagrammatically in FIGS. 3-7, steel bars 10 are bent to a required angle about minimum diameter D. Also shown in FIGS. 3-7, are the lengths of respective end extensions 16 through 20 extending from bends that occur near an end of the bar. The minimum length of an end extension and the minimum allowable diameter of the bend varies with the size of the steel bar and is calculated based on a multiple of the "nominal diameter" of the bar, "nominal diameter" meaning the diameter 22a of steel bar 10 excluding the added height of deformations 23, FIGS. 1 and 2, normally present on the bar, as shown in FIG. 2.

Of course, nominal bar diameters vary with bar size. The dimension referred to as "nominal diameter" 22 is usually denoted "$d_b$". The actual outside diameter (outside the deformations) is the diameter between the outer margin of the deformations and is greater than the nominal diameter by approximately twice the average minimum height of a deformation. The actual nominal diameters for steel bar sizes #3 through #18 are given in Table I, while the minimum average height of the deformations are given in Table II.

TABLE I

| NOMINAL DIAMETERS | |
|---|---|
| Bar Size | Nominal Diameters (inches) |
| #3 | 0.375 |
| #4 | 0.500 |
| #5 | 0.625 |
| #6 | 0.750 |
| #7 | 0.875 |
| #8 | 1.000 |
| #9 | 1.128 |
| #10 | 1.270 |
| #11 | 1.410 |
| #14 | 1.693 |
| #18 | 2.257 |

TABLE II

| MINIMUM AVERAGE HEIGHT OF DEFORMATIONS | |
|---|---|
| Bar Size | Height of Deformations (inches) |
| #3 | 0.015 |
| #4 | 0.020 |
| #5 | 0.028 |
| #6 | 0.038 |
| #7 | 0.044 |
| #8 | 0.050 |
| #9 | 0.058 |
| #10 | 0.064 |
| #11 | 0.071 |
| #14 | 0.085 |
| #18 | 0.102 |

Figure 3:
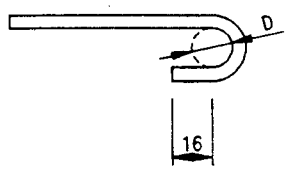
Figure 4:
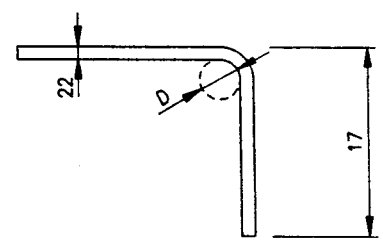
Figure 5:
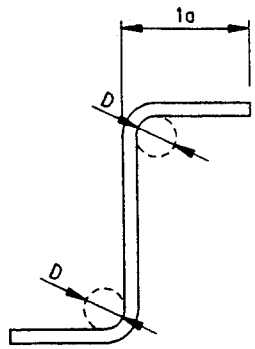
Figure 6:
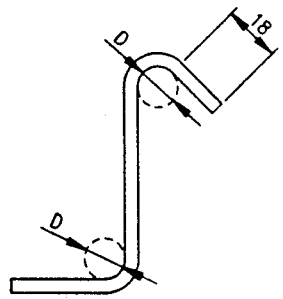
Figure 7:
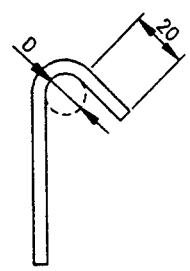

The minimum allowable length of the end extensions 16 through 20 of FIGS. 3 through 7 vary with the size of the bar and the bend. End extension 16 of a 180° bend, as shown in FIG. 3, is a minimum of $4d_b$, but not less than 2½ inches. End extension 17 of FIG. 4 of a 90° bend is a minimum of $12d_b$. For a standard 90° stirrup and tie hook, shown in FIG. 5, end extension 18 is $6d_b$ for bar sizes #3-#5 and $12d_b$ for bar sizes #6-#8. For a 135° standard stirrup and tie hook, shown in FIG. 6, end extension 19 is $6d_b$. For a 135° seismic stirrup and tie hook, shown in FIG. 7, end extension 20 is $10d_b$. Seismic stirrup/tie hooks have a longer end extension and are used in areas of the world subject to earthquakes to increase resistance to earthquake damage.

As shown in FIGS. 3 through 7, minimum bend diameters D are measured from the inside of the bar bend. It is indicated that measurements are from nominal perimeter 22 of bar 10, see FIGS. 2 and 4. The various minimum allowable diameters for the bends of FIGS. 3-7 of the various bar sizes and bends are based on multiples of the nominal diameter as codified by the ACI Building Code and are listed in Table III.

TABLE III

| Bar size | Minimum Diameter |
|---|---|
| Minimum Diameters of Bend For End Hooks | |
| #3 through #8 | $6d_b$ |
| #9, #10, and #11 | $8d_b$ |
| #14 and #18 | $10d_b$ |
| Minimum Diameters of Bend For Stirrups and Ties | |
| #3 through #5 | $4d_b$ |
| #6 through #8 | $6d_b$ |

Accordingly, referring to the nominal bar diameters, the finished bend diameter for the typical bar bends shown in FIGS. 3 through 7 can be calculated and are given in inches in Tables IV and V.

TABLE IV

| RECOMMENDED END HOOKS 90° AND 180° | |
|---|---|
| D = Finished bend diameter | |
| Bar Size | D (inches) |
| #3 | 2.250 |
| #4 | 3.000 |
| #5 | 3.750 |
| #6 | 4.500 |
| #7 | 5.250 |
| #8 | 6.000 |
| #9 | 9.024 |
| #10 | 10.160 |
| #11 | 11.280 |
| #14 | 16.930 |
| #18 | 22.570 |

Standard stirrup and tie hooks are limited to #8 bars and smaller, and the 90° hook with $6d_b$ extension is further limited to #5 bars and smaller.

TABLE V

90° and 135° STIRRUPS AND TIE HOOKS INCLUDING SEISMIC STIRRUPS AND TIES
D = finished bend diameter

| Bar Size | D (inches) |
| --- | --- |
| #3 | 1.500 |
| #4 | 2.000 |
| #5 | 2.500 |
| #6 | 4.500 |
| #7 | 5.250 |
| #8 | 6.000 |

In constructing a set of gauges for determining the minimum bend diameter, the values set forth in Tables I–V are considered. As previously stated, it is indicated that the values are measured from the inside curve of a steel bar of nominal bar diameter. If the steel bar has no deformations, a set of gauges for measuring minimum bend diameter will comprise gauge bodies having smooth rounded margins defining the diameters given in Tables IV and V. However, the steel bars in actual use have deformations which extend into the inside of the bend and which must be taken into account by a gauge.

Figure 8:
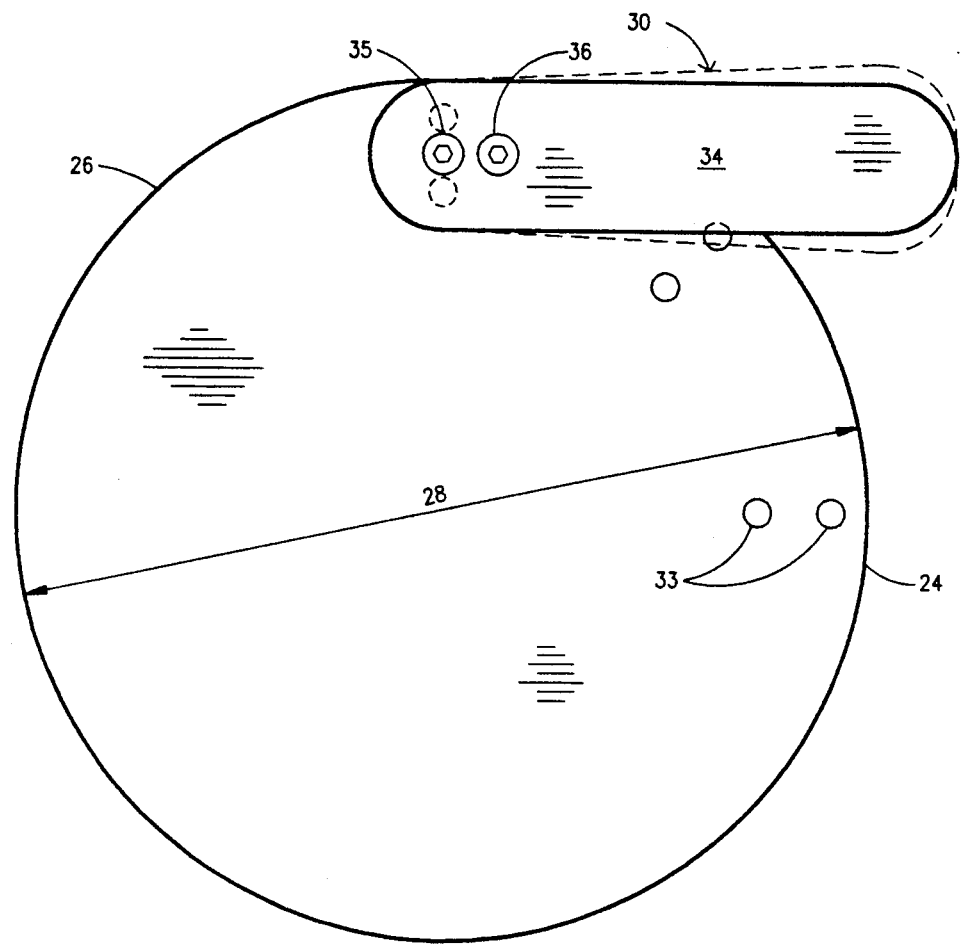

A preferred approach for taking the deformations into account is shown in FIG. 8. The smooth rounded edge 24 of gauge body 26 is constructed to define diameter 28, i.e., the minimum diameter appropriately reduced to take into account the height of the bar deformations 23. The particular diameter defined by the perimeter will depend on the bar size and the bend that the gauge is adapted to measure. The diameters of a set of gauges will approximate the minimum diameters listed in Tables IV and V less twice the height of a deformation as can be calculated by subtracting twice the values given in Table II from the values given in Table I for a given bar size.

Accordingly, a set of gauges could have perimeters defining the diameters shown in Tables VI and VII. Although the gauge diameters are given to three decimal places in Tables VI and VII, it is not necessary that the gauge be constructed to such accuracy. The determination of whether a bend is less than the minimum is estimated from merely observing the gauge-bend interface so a gauge which approximates the given diameters to perhaps the nearest tenth of an inch will serve the desired purpose.

TABLE VI

GAUGE DIAMETERS FOR END HOOKS 90° AND 180°
D = Finished Gauge Diameter

| Bar Size | D (inches) |
| --- | --- |
| #3 | 2.220 |
| #4 | 2.960 |
| #5 | 3.694 |
| #6 | 4.424 |
| #7 | 5.162 |
| #8 | 5.900 |
| #9 | 8.908 |
| #10 | 10.032 |
| #11 | 11.138 |
| #14 | 16.760 |
| #18 | 22.366 |

TABLE VII

90° and 135° STIRRUPS AND TIE HOOKS INCLUDING SEISMIC STIRRUPS AND TIES
D = Finished Gauge Diameter
90° & 135° Hooks

| Bar Size | D (inches) |
| --- | --- |
| #3 | 1.470 |
| #4 | 1.960 |
| #5 | 2.444 |

Diameters, D, for bar sizes #6–#8 are the same as for end hooks

To aid the inspector, all gauges can include angle indication means. In the instance of FIGS. 8-11, angle indication means is provided by an angle indication device 30. Alternatively, angle indication means can be provided by marking the gauge body, 26, FIG. 9, or 27, FIG. at the 0° point and at least one other point at 45°, 90°, 135° or 180° depending on which bar bend the gauge is adapted to verify, and for bar sizes #6, #7, and #8 preferably at all five points, or, even more advantageously, at plus and minus 2½° of the marked points.

By having these points marked, an inspector can easily determine whether the bar is bent at the intended angle within the allowable deviation. Having these points indicated also aids the inspector's determination that the bend diameter is not less than the minimum by defining the inside portion of the bar bend. The beginning and end points of the bend might be indicated, other than by marking, by simply forming the gauge body as portions of 90°, 135°, and 180° disc sections, adding, of course, the plus 2½° allowance and marking the minus 2½° allowance. FIG. 12 shows such a gauge body 27, formed from a 180° sector arc of a circular disc, i.e., the outer marginal portion of a 180° section of a disc. Alternatively, or in addition to being marked at the 0°, 45°, 90°, 135°, and 180° points, the gauge body can be adapted to removably receive the angle indication device 30.

Figure 9:
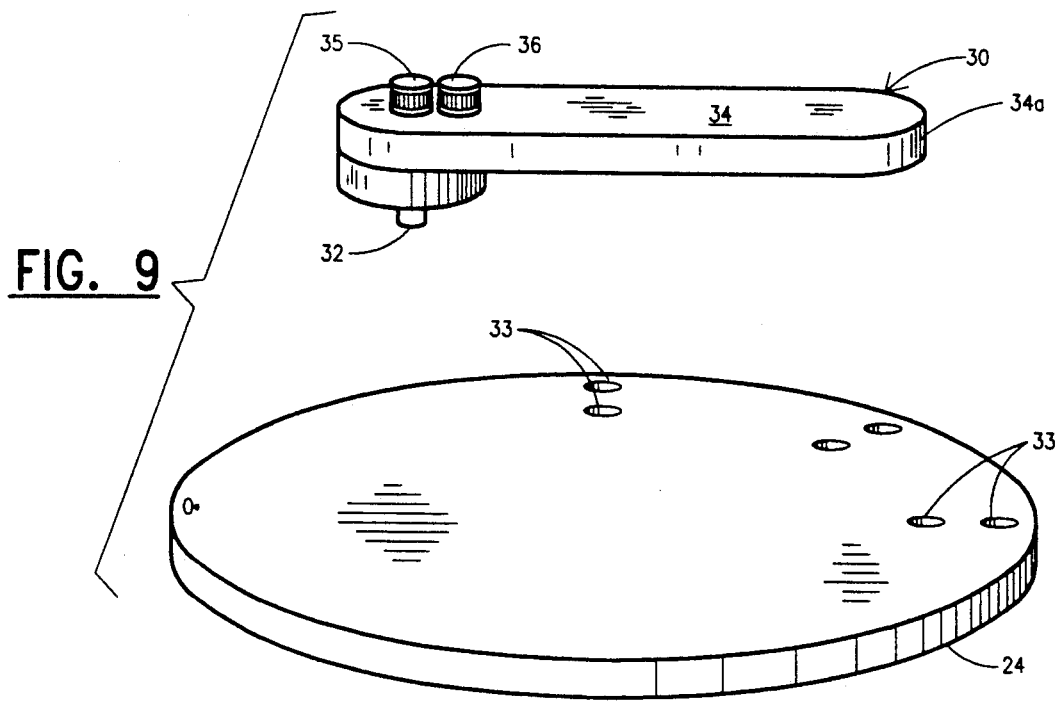
Figure 14:
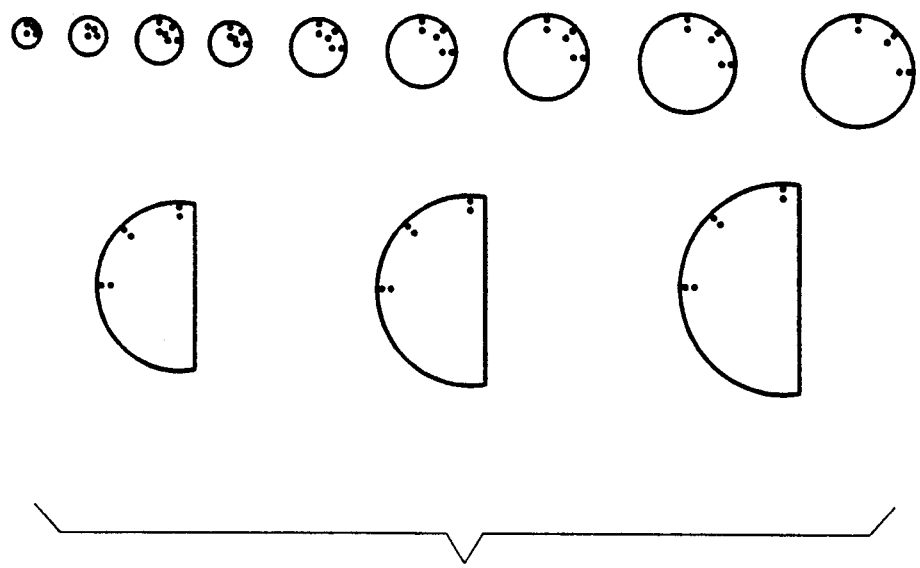

Angle indication device 30 has attachment means, in this instance attachment pins 32, FIGS. 9-11, adapted to be received by corresponding holes 33 in the gauge body. Angle indication device 30 is comprised of elongate arm 34 secured by a pivot pin 35 and a limit stop pin 36 to stationary base member 37. The attachment pins 32 are secured, as by press fitting, into base member 37 so as to extend from the underneath face thereof. The holes 33 of sets of same in the gauge body are aligned so that the attachment pins secure the angle indication arm 30 with its curved free end 34a at either the 45°, 90°, 135°, 180° points to indicate the line of tangency at these points.

Pivot pin 35 and limit stop pin 36 have attachment means a one end, here shown as threaded shafts 35a and 36a, for screwing into threaded receiving opening 37a and 37b, respectively in base member 37, and smooth shaft 35b and 36b which are received by respective holes 38 and 39 in the end of arm 34 that pivots on stationary base member 37. The heads 35b and 36b of pivot pins 35 and 36 are larger than the holes 38 and 39 to limit the depth of insertion of the respective pins.

Pivot pin 36 is axially aligned with pivot pin 35 along the center line of arm 34. The hole 39 in the arm 34 through which pivot pin 36 extends is an elongate slot, which restricts rotation of the arm to plus or minus 2½°.

A gauge according to the invention may be a full circular disc of the appropriate diameter, as shown in FIGS. 8 and 9, and also 13, although it need not be a full circular disc. The gauge body can be any fraction of a disc, or can be just the outer portion of the disc, as is the disc 27 in FIG. 12. At minimum, it is at least a sector arc of a circle, e.g., the outer marginal portion of a quarter section (not shown), i.e., a 90° section of a disc, of the appropriate diameter. However, since the minimum bend diameter for end hooks and for stirrup and tie hooks for bar sizes #6 through #8 is the same, it is preferable that a gauge adapted to measure these bends be at least the outer marginal portion of a 180° section 27 of a circular disc of the appropriate diameter.

Figure 13:
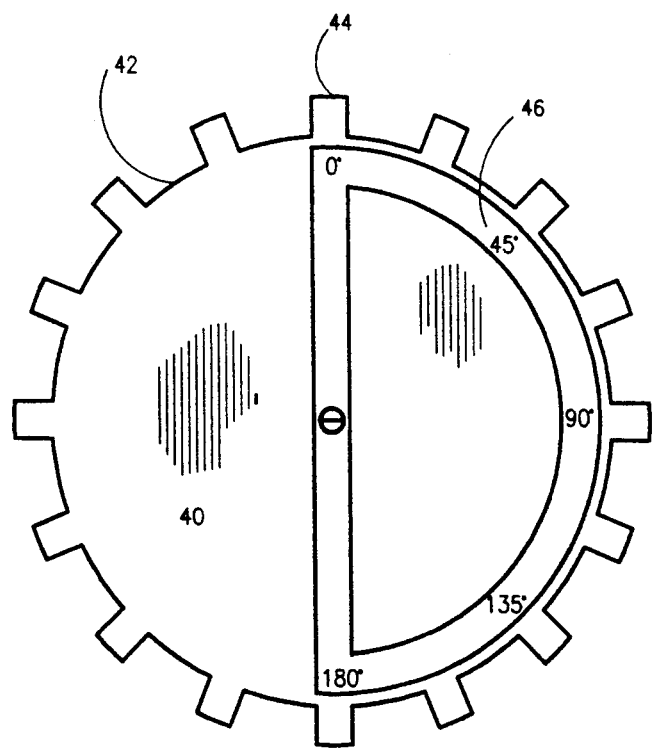

An alternative approach for taking into account the extension of the deformations into the minimum diameter is to construct a gauge device having a body 40, FIG. 13, with recesses 42 about its circumference adapted to receive deformations 23 on the reinforcement bar. Recesses 42 must be at least large enough to accommodate the deformations of the bar whose size the particular gauge is adapted to measure and must be appropriately spaced so that adjacent deformations on the steel bar will fit into adjacent recesses on the gauge body.

The perimeter of the gauge body 40 between the recesses form protuberances 44. It is the outside diameter of gauge body 40, defined by the outer ends of the protuberances, which approximates the minimum bend diameter. Accordingly, a set of gauges will include individual gauge bodies wherein the protuberances define outside diameters approximating the diameters listed in Tables IV and V.

With such a set of gauges constructed with recesses notches 42, as just disclosed, it is not possible to indicate the beginning and ending of a bend on the gauge bodies per se, or by means of angle indication arms, because the bends occur on the bar at random with respect to the location of the deformations. To provide angle indication means, it is thus necessary that such a means, here shown as a protractor 46, be pivotally mounted at the center of a gauge body for rotation related to the recesses or notches 42 on the gauge body. The protractor can be and preferably is marked at only the points of interest, 45°, 90°135°, and 180°, and plus and minus 2½° at these points as indicated. When the gauge is abutted against the inside of the bar bend, the protractor 46 can be aligned with the beginning or end of the bend and thus aid the inspector in determining: the dimension of the inside of the bar bend; that the bend angle is within the allowable standard; and where the points of tangency occur.

In a set of gauges, one critical feature of each gauge is that its perimeter define a diameter that at least approximates the minimum bend diameter for a given bar size and bend and takes into account the deformations on the bar. Otherwise the construction of the gauges may vary within a wide range of options. The thickness of the gauge body is not critical, but it is probably preferable to keep it equal to or less than the nominal diameter of the bar, for easy comparison of the gauge/bend interface, and as thin as practicable to minimize weight. The disc is preferably constructed from a lightweight, durable material, such as anodized aluminum. Nevertheless it could be constructed of any material, e.g., ceramic, nylon, plastic, wood, or paperboard.

It is contemplated that the gauges of the invention will be used according to methods herein disclosed for determining whether a given bar bend is within the allowable angle of bend and has a bend diameter and end extension that is equal to or greater than the established allowable limits. The method for measuring the minimum diameter comprises the step of abutting the appropriate gauge body for a particular bar size against the inside of the bend and observing the interface between the such gauge body and the bend. Gaps between two points of contact along the interface indicate that the bar has a bend diameter less than the minimum. Additional aid in determining the inside bar bend dimension can be provided by indications of the points of tangency or with the aid of the angle indication means as disclosed above.

Another method is employed for determining whether the end extension is less than the minimum length. Here, the gauge body must be marked or must otherwise indicate the beginning and end of the bend. The gauge body is abutted against the inside of a bend, and then is aligned so that the end of the bend is indicated. Then, the end extension is measured from the end of the bend. Finally, the measured length is compared to the established allowable limit.

The invention contemplates gauges whose perimeters define diameters approximating established allowable limits for the various bar sizes and bends. However, changes in building materials may require changes in the established allowable limits. Also, new bar sizes or new bends may come into use. Thus, new limits may be established in the future. The invention contemplates such changes or innovations. Furthermore, although the invention is here illustrated and described with reference to embodiments thereof presently contemplated as the best mode of carrying out such invention in actual practice, it is to be understood that various other changes may be made in adapting the invention to different embodiments without departing from the broader inventive concepts disclosed herein and comprehended by the claims that follow.

I claim:

1. A gauge for determining whether a dimension or dimensions of a particular allowable size bend in a particular size steel reinforcing bar of the type used in concrete construction is or are more or less than the established allowable limit or limits, comprising:

a gauge body formed to provide at least a sector arc portion of a circular disc having a diameter approximating the minimum allowable bend diameter for a particular bar bend size in a particular size of reinforcing bar, said circular disc taking into account any deformations on said bar and having a diameter selected from allowable bend dimensions of allowable reinforcement bar diameters; a protractor pivotally attached at the center of the gauge body for lining up with the beginning and ending of the bar bend, whereby when said sector arc portion of said gauge body is abutted against the inside of a bar bend it can be determined by observation of the interface between said gauge and said bend whether the bend has exceeded the minimum bend diameter.

2. A gauge according to claim 1, wherein there are multiple gauges, one for each of #3 through #18 bar sizes.

3. A gauge for determining whether a dimension or dimensions of a particular allowable size bend in a particular size reinforcing bar of the type used in concrete construction is or are more or less than the established allowable limit or limits, comprising:

a gauge body formed to provide at least a sector arc portion of a circular disc having a diameter approximating the minimum allowable bend diameter for a particular bar bend size in a particular size of reinforcing bar, said circular disc taking into account any deformations on said bar and having a diameter selected from allowable bend dimensions of allowable reinforcement bar diameters; said gauge body having holes disposed in the gauge body along at least one of the points 45°, 90°, 135°, and 180°, for the removable attachment of an angle indication device; and angle indication device comprising an elongate arm having a hole and a transverse slot aligned axially of said arm at one end thereof; a stationary base member attached to said arm by a pivot pin and a limit stop pin disposed in the hole and slot, respectively, said slot permitting limited rotation of said elongate arm about said pivot pin to the extent of plus or minus 2½°; and attachment means securing the stationary base member to said gauge body.

4. A gauge according to claim 3, wherein there are multiple gauges, one for each of #3 through #18 bar sizes.

* * * * *